(12) United States Patent
Tenny et al.

(10) Patent No.: US 9,986,476 B2
(45) Date of Patent: May 29, 2018

(54) SCHEDULING AND HANDOVER OF A VEHICULAR CONNECTION WITH PERIODIC MESSAGING

(71) Applicant: Futurewei Technologies, Inc., Plano, TX (US)

(72) Inventors: Nathan Tenny, Poway, CA (US); Guowei Ouyang, Peking (CN); Mazin Al-Shalash, Frisco, TX (US); Zhenzhen Cao, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 167 days.

(21) Appl. No.: 15/183,354

(22) Filed: Jun. 15, 2016

(65) Prior Publication Data

US 2017/0257803 A1 Sep. 7, 2017

Related U.S. Application Data

(60) Provisional application No. 62/301,732, filed on Mar. 1, 2016.

(51) Int. Cl.
*H04L 29/08* (2006.01)
*H04W 36/10* (2009.01)
(Continued)

(52) U.S. Cl.
CPC ......... *H04W 36/0088* (2013.01); *H04L 67/12* (2013.01); *H04W 4/005* (2013.01);
(Continued)

(58) Field of Classification Search
CPC .... H04L 67/12; H04W 4/005; H04W 76/023; H04W 36/10; H04W 36/30; H04W 36/0088
See application file for complete search history.

(56) References Cited

U.S. PATENT DOCUMENTS 9,668,184 B1* 5/2017 Ramamurthy ........ H04W 36/16
2011/0106952 A1 5/2011 Doppler et al.
(Continued)

FOREIGN PATENT DOCUMENTS

CN 101064561 10/2007
CN 102090132 6/2011
(Continued)

OTHER PUBLICATIONS

"International Application No. PCT/CN2017/072667, International Search Report and Written Opinion dated May 4, 2017", (May 4, 2017), 6 pgs.

*Primary Examiner* — Brian D Nguyen
(74) *Attorney, Agent, or Firm* — Schwegman Lundberg & Woessner, P.A.

(57) ABSTRACT

A method, operable at a network node of a wireless network, schedules radio resource usage for a mobile device to transmit on a device-to-device connection. The method includes receiving, from the mobile device, an indication of a requirement for transmission resources, comprising at least an indication that the resources are required with a periodicity, transmitting, to the mobile device, an assignment of a first scheduling configuration for the device-to-device connection, comprising at least an indication of periodically recurring radio resources to be used for a plurality of instances of a message transmission on the device-to-device connection, transmitting, to the mobile device, an indication to begin use of the periodically recurring radio resources, and handing over responsibility for providing radio resources for the device-to-device connection from the network node to a target network node such that the availability of radio resources with the periodicity is substantially maintained.

20 Claims, 4 Drawing Sheets

(51) Int. Cl.
*H04W 36/00* (2009.01)
*H04W 4/00* (2018.01)
*H04W 36/30* (2009.01)
*H04W 76/02* (2009.01)

(52) U.S. Cl.
CPC .......... *H04W 36/10* (2013.01); *H04W 36/30* (2013.01); *H04W 76/023* (2013.01)

(56) References Cited

U.S. PATENT DOCUMENTS

| | | | |
|---|---|---|---|
| 2013/0083702 A1* | 4/2013 | Barany | H04W 28/06 370/261 |
| 2013/0102314 A1 | 4/2013 | Koskela et al. | |
| 2014/0256328 A1* | 9/2014 | Li | H04L 5/0051 455/444 |
| 2015/0011233 A1* | 1/2015 | Kazmi | H04W 16/14 455/454 |
| 2015/0163041 A1* | 6/2015 | Kodali | H04L 1/1812 370/252 |
| 2016/0073298 A1 | 3/2016 | Brahmi et al. | |

FOREIGN PATENT DOCUMENTS

| | | |
|---|---|---|
| CN | 102783211 | 11/2012 |
| CN | 105165058 | 12/2015 |
| WO | WO-2015032436 | 3/2015 |

\* cited by examiner

SCHEDULING AND HANDOVER OF A VEHICULAR CONNECTION WITH PERIODIC MESSAGING

RELATED APPLICATION

This application claims priority to U.S. Provisional Application Ser. No. 62/301,732 (entitled "Scheduling and Handover of a Vehicular Connection With Periodic Messaging," filed Mar. 1, 2016) which is incorporated herein by reference.

FIELD OF THE INVENTION

The present disclosure is related to a wireless vehicular connection and in particular to Scheduling and Handover of a Vehicular Connection with Periodic Messaging.

BACKGROUND

Currently, vehicle to vehicle (V2V) wireless communications may use periodic broadcast transmissions on a sidelink. The resources for sidelink communication may be partially or wholly managed by a serving evolved Node B (eNode B or eNB). When vehicles move out of range of an eNB, referred to as a source eNB, the wireless communications may be handed over to a target eNB that is now within range of the vehicle. The handover may not be timely enough to meet latency requirements of messages such as the periodic broadcast transmissions.

SUMMARY

A method, operable at a network node of a wireless network, schedules radio resource usage for a mobile device to transmit on a device-to-device connection. The method includes receiving, from the mobile device, an indication of a requirement for transmission resources, comprising at least an indication that the resources are required with a periodicity, transmitting, to the mobile device, an assignment of a first scheduling configuration for the device-to-device connection, comprising at least an indication of periodically recurring radio resources to be used for a plurality of instances of a message transmission on the device-to-device connection, transmitting, to the mobile device, an indication to begin use of the periodically recurring radio resources, and handing over responsibility for providing radio resources for the device-to-device connection from the network node to a target network node such that the availability of radio resources with the periodicity is substantially maintained.

A further method includes receiving at a source network node of a wireless network, from a mobile device, an indication of a requirement for transmission resources having periodicity, transmitting, to the mobile device via the source network node, an assignment of a first periodical scheduling configuration for a device-to-device connection, transmitting, to the mobile device, an indication to begin use of the periodically recurring radio resources, and handing over responsibility for providing radio resources for the device-to-device connection from the source network node to a target network node such that periodicity of the recurring radio resources after handover is maintained.

DETAILED DESCRIPTION

Figure 1:
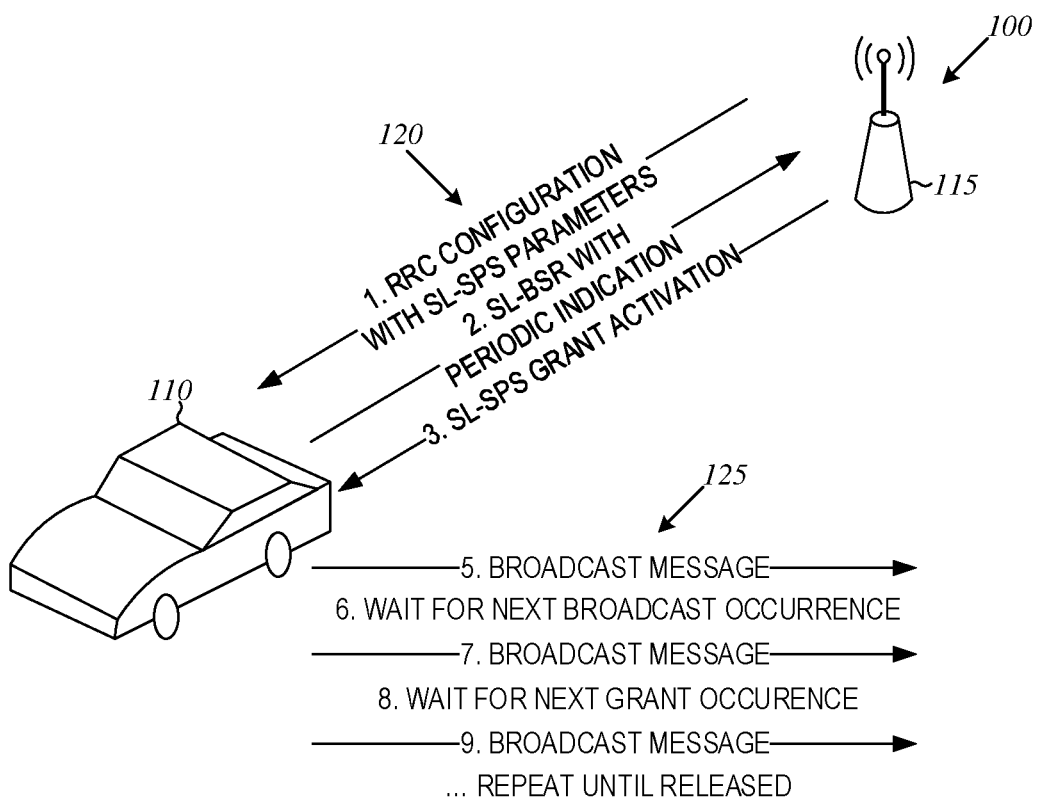
FIG. 1 is a block diagram illustrating a mechanism for semi-persistent scheduling for vehicle-to-vehicle communications according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Vehicle to vehicle (V2V) communications may be performed directly between vehicles on resources that are allocated to the vehicles by nodes such as an eNB (enhanced node B). The communications may use periodic broadcast transmissions on PC5, which is a sidelink interface. Sidelink resource allocation may be requested by vehicle user equipment (UE) transmission of an indication of available data, e.g. a sidelink buffer status report (SLBSR), to an eNB (enhanced node B), to request a sidelink grant every time a message needs to be sent. The messages exchanged between vehicles may provide information about the status of the vehicle, such as location, speed, application of brakes, and other parameters that vehicles may use to coordinate actions and avoid collisions.

Since the messages are periodic or quasi-periodic, granting of resources for V2V communications may be improved by using a periodic grant (like semi-persistent scheduling (SPS) on a regular interface from a mobile device to a base station referred to as a Uu interface). Along with the periodicity, there is a latency requirement for transmission.

A message needs to be sent within [x] ms, referred to as a delivery time, after the previous copy of the same message (the value of x depends on the period, allowing for scheduling delay, repetitions, etc.). In case of handover (HO) between a source eNB and a target eNB, the vehicle whose UE is involved in the handover may send one transmission of a broadcast message in the source eNB before the handover, and the next transmission of the same message in the target eNB after the handover. The second transmission may use radio resources that are made available by the target eNB at the time of the handover. However, the latency for the target eNB to provide the radio resources may create a problem in meeting the latency requirement for the second transmission, e.g., due to the resources not yet being available when the delivery time arrives. In particular, the timing of the second transmission is difficult if the handover is near the end of a repetition period.

After handover, the UE needs to configure itself according to the new, target eNB, send SLBSR to the target eNB, and receive a sidelink grant within the new, target eNB's sidelink resource pool. Each of these steps incurs some latency.

The sum of these latencies, i.e. the sum (HO latency)+ (config latency)+(BSR/grant time)+(wait time for grant), should not exceed the remaining "time to transmit" before the handover. If this constraint cannot be met, the message transmitted after the handover may miss its required delivery time. Today, meeting this constraint cannot be guaranteed. In particular, neither source eNB nor target eNB knows the latency requirement.

In prior V2V messaging, periodic V2V messages are expected to use periods in the range of 100 ms. This is within normal ranges of the LTE SPS periods (10-640 ms). There is no reliable delivery in V2V broadcast messaging, but blind transmissions could be used to increase the probability of successful reception. Resource usage for PC5 sidelink communication may utilize a sidelink resource pool associated with the eNB serving the transmitting UE. The sidelink resource pool for the eNB may be configured through operations, administration, and management (OAM). Each eNB manages its own resources.

There is currently no provision for dynamic coordination between eNBs in their assignment of sidelink resources, but OAM could use static or semi-static approaches (e.g. fractional frequency reuse (FFR)) for coordination of sidelink resources. During handover, there is no way to instruct the UE to maintain the currently assigned PC5 resources.

The source eNB sidelink resource configuration may not be valid in the target eNB. The UE and the target eNB may negotiate a new set of resources if communication on PC5 is to continue. Delay is a concern if there are messages to be delivered under a deadline. In other words, such a negotiation may not occur in time for timely delivery of the next message.

In one embodiment, coordination mechanisms may be used during handover from the source eNB to the target eNB so that a device (e.g. vehicle) using SPS on PC5 can maintain its sidelink communication without needing to renegotiate after the handover.

The coordination mechanisms provide for semi-persistent scheduling (SPS) for PC5 as shown generally at 100 in FIG. 1. The UE 110, represented as a car, may be configured by the eNB 115 with a sidelink semi-persistent scheduling (SL-SPS) grant, which can be activated when needed. The SLBSR format may be modified to indicate a need for periodic resources, or a radio resource control (RRC) protocol message may be used to request periodical scheduling. Scheduling communications between the UE 110 and eNB 115 are illustrated at 120. Periodic broadcasts by the UE 110 for reception by other vehicles is indicated at 125. Each vehicle may negotiate for side channel resources to use for similar broadcasts such that vehicles within range of each other may receive the broadcast information.

In one embodiment, an SL-SPS configuration is added to RRC. The UE's use of the SL-SPS configuration may be started by a regular downlink grant, as with SPS grants on the Uu interface. Using the same grant format may avoid a need for a new or changed downlink control information (DCI) format, instead allowing the use of a format such as the existing DCI format 5. A new "sidelink semi-persistent scheduling radio network temporary identifier" (SL-SPS-RNTI) may also be used to address the downlink grant as discussed later. Release of the resources may be done by signaling from upper layers (e.g., RRC tells the UE to release), and/or by explicit release on a physical downlink control channel (PDCCH).

Figure 2:
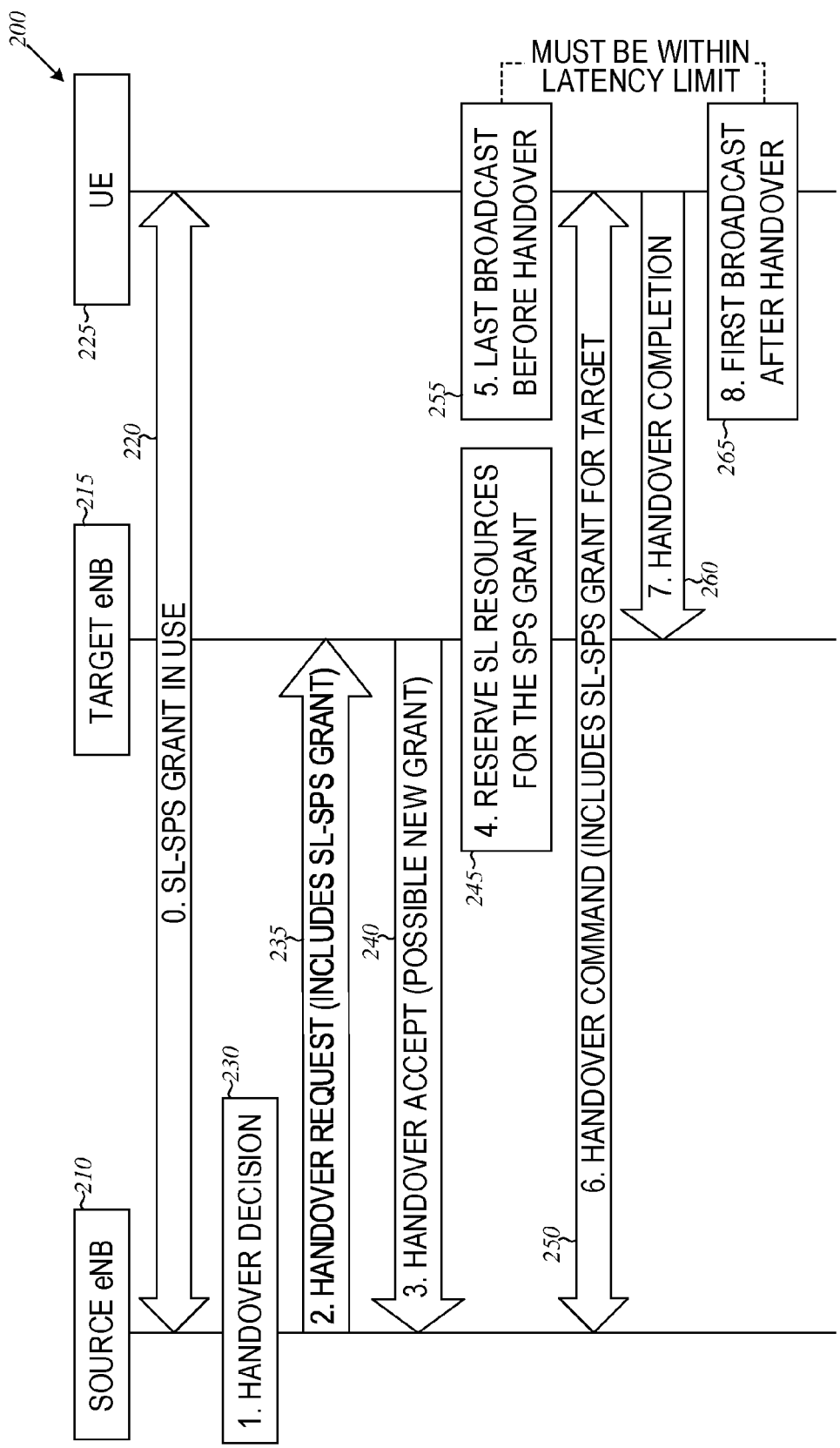
FIG. 2 is a timing and flow diagram illustrating handover between a source and a target of vehicle-to-vehicle communications according to an example embodiment.

As illustrated in a timing and flow diagram at 200 in FIG. 2, handover from a source eNB 210 to a target eNB 215 may be performed by including an SL-SPS configuration in handover preparation. In one embodiment, the source eNB 210 has granted an SL-SPS, which is shown at 220 as in use by UE 225. At 230, a handover decision has been made by the source eNB. A handover request 235 that includes an LS-SPS grant is provided to the target eNB 215 from source eNB 210. An HO accept message 240 from the target eNB 215 indicates if the target eBN 215 will allow SL-SPS to continue, and may include a new configuration/grant instead of accepting the one from the source. The new configuration/grant allows the target to deconflict resources (e.g., in case the source grant uses resources that in the target are already allocated).

At 245, the target eNB 215 reserves SL resources for the SPS grant. An HO command 250 may be sent from the source eNB 210 to the UE 225 that includes the new configuration/grant if one was provided, and otherwise, indicates if the SL-SPS continues or releases. If the grant continues or a new one comes, the UE can begin using it right after handover. A last broadcast by the UE 225 before the handover is illustrated at 255. Handover completion is indicated at 260, and a first broadcast 265 by the UE 225 after the handover completion occurs within a latency limit from broadcast 255.

The source eNB 210 may try to optimize the timing of the handover, for example, right after the UE 225 has made its previous transmission 255 or shortly before a transmit opportunity in the target eNB cell. Timing information between the cells may be used to support optimization of the timing. Timing aspects may be specified or left to network implementation.

Impact to spec areas may include indication of requested SL-SPS parameters, RRC/MAC signaling, X2-AP, and a few miscellaneous procedures on eNB side. Some parameters utilized in the handover may include a requested periodicity for provision to the eNB and an indication of delivery requirements such as delay tolerance. In the existing SPS mechanisms, values for the above may be determined by the network based on QoS, traffic class, and so on. In V2V communication, the equivalent information is not already known to the network, so the network may rely on the UE 225 to provide needed information for configuring an appropriate SL-SPS grant. The UE 225 may already know the periodicity it needs, so it may signal requested SPS parameters to the network.

RRC changes may include a new information element (IE) for SL-SPS configuration (e.g. in the RRCConnectionReconfiguration message or in another message that provides configuration parameters to the UE). In the handover case, the target eNB 215 may always include SL-SPS configuration information, even if the included configuration just echoes back the one sent by the source eNB 210.

A "Release" instruction for the SPS configuration may be included in RRC messaging. The release instruction may be indicated explicitly or implicitly. As an example of an implicit indication, the message format containing the SL-SPS configuration IE may be subject to a requirement that the configuration will be released if the IE is not provided ("Need OR" in the parlance of the ASN.1 message description formats in the LTE RRC specification). With such a requirement in place, any reconfiguration that did not include SL-SPS settings would release the grant. Alternatively, deactivation could be done explicitly on PDCCH or another channel.

Changes to media access control (MAC) may include procedures for activating/deactivating the configuration (grant based). Activation can be closely based on SPS equivalent procedures. An easy way is to use a new SLSPS-RNTI as an identifier that can be sent by the network to indicate a message related to the SL-SPS configuration for the UE. To detect an SLSPS-RNTI, the UE may have an expanded search space for use when identifying messages of interest in a downlink channel such as the PDCCH.

Impact to UE procedures may include a UE procedure to activate SL-SPS upon handover (without waiting for an additional trigger). No implicit release is needed for SL-SPS. An explicit release on PDCCH is possible, by addressing to the SLSPS-RNTI. However, if there is no separate identifier dedicated to this purpose such as a new SLSPS-RNTI, this mechanism may not be workable, as the meaning of a message addressed to an existing identifier (e.g., the UE's SPS-RNTI) would be ambiguous.

Changes to the X2-AP protocol may include a new IE for SL-SPS configuration in handover preparation message. Note that it may be possible to deliver the configuration in the corresponding HO accept message 240 without changes to the HO accept message format, e.g. by transferring the configuration inside an encapsulated message such as the RRC reconfiguration message.

There may be miscellaneous impacts to eNB, such as an optional eNB behavior to set HO timing according to the existing or new grant, or possible procedures to coordinate timing aspects, so that the source knows when the target's granted resources will come and can configure the UE and/or time the handover accordingly.

Figure 3:
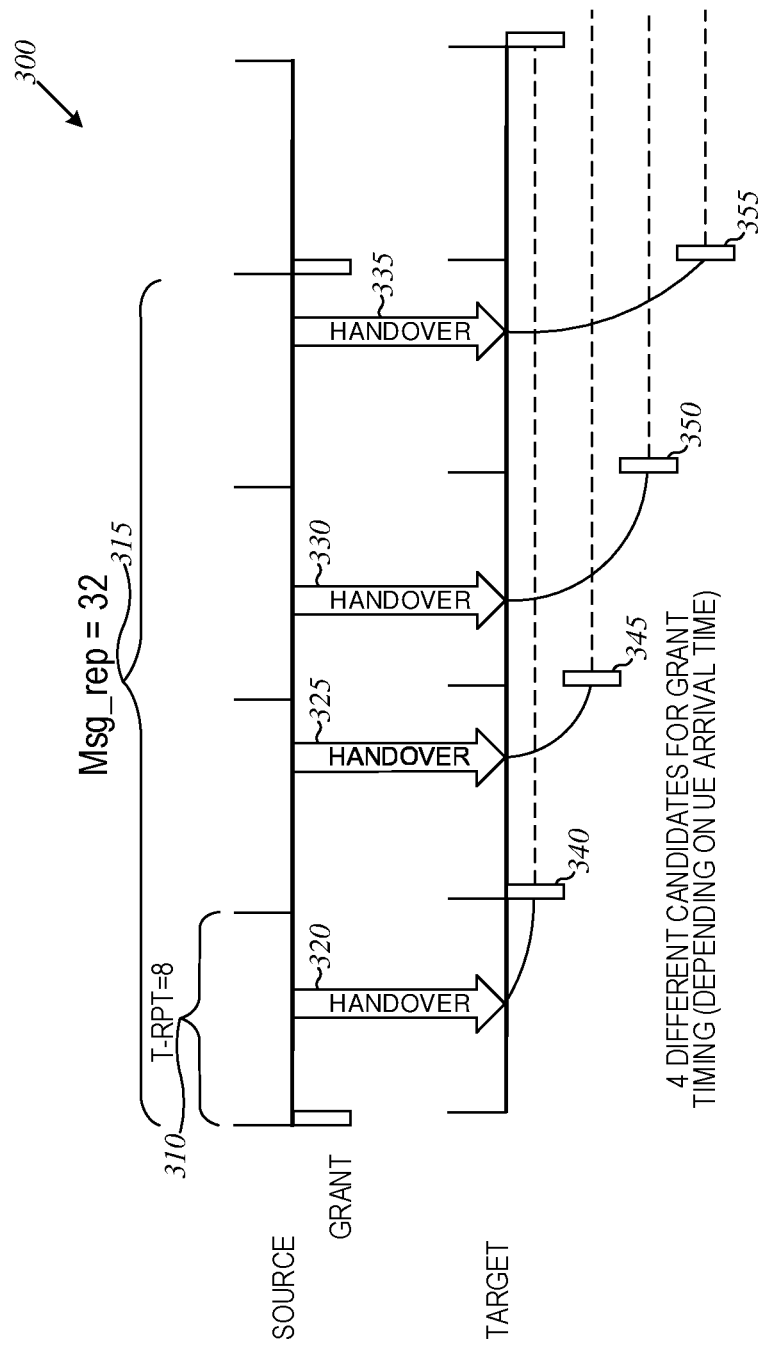
FIG. 3 is a timing diagram illustrating timing aspects in the handover according to an example embodiment.

FIG. 3 is a timing diagram illustrating timing aspects at 300 in the handover. In one example, the sidelink repetition period T-RPT=8 ms at 310, and a message periodicity=32 ms at 315, in the target cell. These numbers are for example only and chosen for convenient illustration. The numbers may vary significantly in various implementations or according to specifications.

The target cell may not know exactly when the UE will arrive. The UE in the target cell will need to transmit every 32 ms according to these example numbers, i.e. every $4^{th}$ SL repetition period. To allocate resources correctly, however, the target cell should know more than the 32 ms periodicity; it should also know in which T-RPT interval the UE will start transmitting. There are four different possibilities for when the target cell starts transmitting, corresponding to each SL repetition period within the 32 ms message period.

Three methods to align the grant timing after handover are now described. Note that these methods may be used to substantially maintain periodicity after the handover. Substantially maintaining periodicity may include minor changes in message periods that cause the transmissions to deviate from a strictly periodic schedule, while still maintaining the structure of the transmission as a series of repetitions at intervals. Such variation in the schedule might result, for example, from lack of suitable resources at the instant of transmission that would be implied by a periodic schedule, by a scheduler implementation that attempts to transmit slightly earlier than required to allow a guard time for delays, or by various constraints or features of the transmitter and system.

In a UE-centric approach, the target eNB reserves all the possible grants, e.g., four grant locations 320, 325, 330, and 335 spaced 8 ms apart over a 32 ms message period, until the handover is done. Transmissions are indicated at 340, 345, 350, and 355 for one message periodicity period 315. Reserving all the possible grants may result in over-reservation of SL resources by a factor of (Msg_rep/T-RPT). For short handover times or low-load situations on SL, this may be OK, but in some circumstances it may be an unwanted burden on the target eNB's radio resources. After arriving in the target eNB through handover, the UE will then notify the target as to which grant it occupies. The grant that is occupied may not be the very first one after the handover completion. The occupied grant may be indicated in any convenient uplink message towards the target eNB. The indication may use various protocols and communication elements, such as an IE in an RRC message, a MAC control element (CE), etc.

In an alternative eNB-centric approach, the target gives a specific start time (e.g. system frame number (SFN) and subframe number). If the UE arrives before this time, it has to wait to transmit its broadcast message. If the UE arrives later, it has to wait until the message repetition period from start time (32 ms in the previous example) has passed.

The tradeoff is clear. The UE-centric approach always uses the earliest possible transmission time, at the cost of extra resource reservation. eNB-centric is the opposite, reducing the amount of resources that need to be reserved but potentially increasing the latency for the first transmission after handover. The eNB-centric approach risks missing the delivery time.

A third way of aligning the grant timing after handover utilizes an exceptional resource pool, which is a resource that the UE can use at its own prerogative (within certain specified constraints). Upon arrival in the target cell, the UE reads system information block 18 (SIB 18) to get the exceptional resource pool. The UE uses the exceptional resources (also known as transmitting in Mode 2) until further instructed.

The UE also remembers its previously existing grant configuration. When the eNB is aware of the handover completion, it triggers the UE to start transmission on the existing configuration. A normal trigger may be on PDCCH, using SLSPS-RNTI. The timing of the trigger may be used to determine the timing of the grant. In one embodiment, the UE uses the first "start occasion" after it receives the trigger. Other embodiments may involve using a different time, e.g., allowing a guard time for configuration or other activities after receiving the grant.

Figure 4:
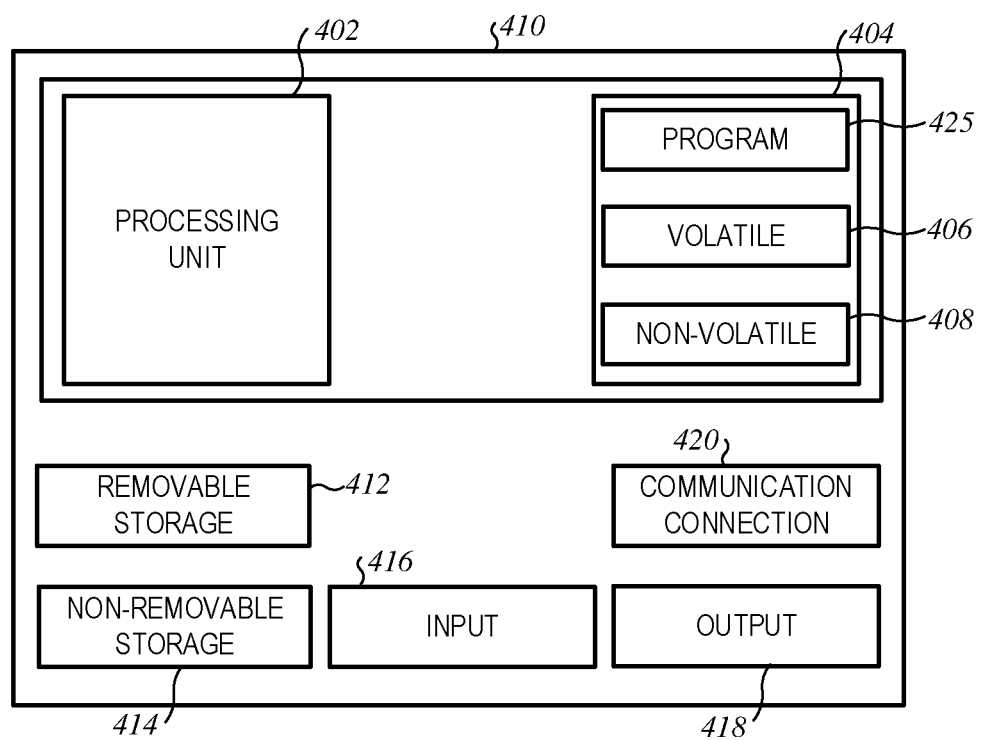
FIG. 4 is a block diagram illustrating circuitry for implementing various devices, algorithms and performing methods according to example embodiments.

FIG. 4 is a block diagram illustrating circuitry for clients, servers, cloud based resources for implementing algorithms and performing methods according to example embodiments. All components need not be used in various embodiments. For example, the UE, such as a smart phone or cellular communication device in a vehicle, and eNB devices may each use a different set of components, or in the case of servers for example, larger storage devices.

Use of the phrase "user equipment" or "UE" may be defined to encompass any of the above-described communication devices as well as any other communication device, wireless or wireline, that may perform operations described herein. The UE may be coupled to circuitry in a vehicle to facilitate vehicle to vehicle communications described herein and to communicate with one or more eNBs.

An eNB may include any type of base station capable of communicating with UEs and providing resources to allow eNBs to broadcast information to communicate with other UEs. The circuitry may also be used to implement eNBs.

One example computing device in the form of a computer 410 may include a processing unit 402, memory 404, removable storage 412, and non-removable storage 414. Although the example computing device is illustrated and described as computer 410, the computing device may be in different forms in different embodiments. For example, the computing device may be a blade computer or desktop in a data center for implementing a virtual switch, or other computing device including the same or similar elements as illustrated and described with regard to FIG. 4. Devices, such as blade computers or desktop computers are generally collectively referred to as computer devices or user equipment. Further, although the various data storage elements are illustrated as part of the computer 410.

Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. Output 418 may include a display device, such as a touchscreen, that also may serve as an input device. The input 416 may include one or more of a touchscreen, touchpad, mouse, keyboard, camera, one or more device-specific buttons, one or more sensors integrated within or coupled via wired or wireless data connections to the computer 410, and other input devices. For a virtual switch, the input 416 and output 418 may be in the form of a network interface card. The computer in one embodiment operates in a networked environment using a communication connection to connect to one or more remote computers, such as database servers. The remote computer may include a personal computer (PC), server, router, switch, a peer device or other common network node, or the like. The communication connection may include a Local Area Network (LAN), a Wide Area Network (WAN), cellular network, or other networks.

Computer-readable instructions stored on a computer-readable medium are executable by the processing unit 402 of the computer 410. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 404 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 400 to provide generic access controls in a COM based computer network system having multiple users and servers.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method, operable at a network node of a wireless network, of scheduling radio resource usage for a mobile device to transmit on a device-to-device connection, the method comprising:
   receiving, from the mobile device, an indication of a requirement for transmission resources, comprising at least an indication that the resources are required with a periodicity;
   transmitting, to the mobile device, an assignment of a first scheduling configuration for the device-to-device connection, comprising at least an indication of periodically recurring radio resources to be used for a plurality of instances of a message transmission on the device-to-device connection;
   transmitting, to the mobile device, an indication to begin use of the periodically recurring radio resources; and
   handing over responsibility for providing radio resources for the device-to-device connection from the network node to a target network node such that the availability of radio resources with the periodicity is substantially maintained.

2. The method of claim 1, wherein the indication of a requirement for transmission resources further comprises at least one requested parameter for the first scheduling configuration.

3. The method of claim 1, and further comprising transmitting, to the mobile device, an indication to release the periodically recurring radio resources.

4. The method of claim 1, wherein maintaining periodicity comprises:
   transmitting, to a second network node of a wireless network, a message indicating possible handover of the mobile device, the message comprising an indication of the first scheduling configuration;
   receiving, from the second network node, a message accepting the possible handover, the message comprising an indication of a second scheduling configuration for use by the mobile device before completion of the handover; and
   sending, to the mobile device, a message to trigger handover, the message including an indication that the UE should use the second scheduling configuration after the handover.

5. The method of claim 4, wherein receiving the message accepting the handover occurs before a first scheduling occasion according to the first scheduling configuration, and the sending the message to trigger the handover occurs after the first scheduling occasion and prior to a second scheduling occasion according to the second scheduling configuration, the first and second scheduling occasions being separated by a time less than the periodicity requested by the mobile device.

6. The method of claim 4, wherein the second scheduling configuration comprises a periodicity greater than a repetition period configured by the second network node for a resource pool to be used by the device-to-device connection.

7. The method of claim 6, wherein the second network node reserves radio resources in each of a plurality of instances of the repetition period before the completion of the handover, and wherein the second network node reserves radio resources with a periodicity corresponding to the periodicity of the second scheduling configuration after the completion of the handover.

8. The method of claim 7, wherein the second network node receives from the mobile device a signaling message comprising an indication that the mobile device has selected a one of the plurality of instances of the repetition period before the completion of the handover.

9. The method of claim 8, wherein the second network node determines the radio resources with a periodicity corresponding to the periodicity of the second scheduling configuration based at least in part on the indication that the mobile device has selected a one of the plurality of instances of the repetition period before the completion of the handover.

10. The method of claim 6, wherein the second scheduling configuration further comprises a start time identifying an instance of the repetition period in which the mobile device may begin use of the second scheduling configuration.

11. The method of claim 6, further comprising:
broadcasting a configuration of exceptional resources for device-to-device communication; and
transmitting to the mobile device, an indication of completion of the handover and to begin using the second scheduling configuration;
wherein the mobile device uses the configuration of exceptional resources for communication prior to receiving the instruction to begin using the second scheduling configuration.

12. The method of claim 1, wherein the indication of a requirement for transmission resources further comprises an identity of the mobile device to be used for management of the first scheduling configuration.

13. A method comprising:
receiving at a source network node of a wireless network, from a mobile device, an indication of a requirement for transmission resources having periodicity;
transmitting, to the mobile device via the source network node, an assignment of a first periodical scheduling configuration for a device-to-device connection;
transmitting, to the mobile device, an indication to begin use of the periodically recurring radio resources; and
handing over responsibility for providing radio resources for the device-to-device connection from the source network node to a target network node such that periodicity of the recurring radio resources after handover is maintained.

14. The method of claim 13, wherein periodicity is maintained by causing the target network node to reserve recurring radio resources for all possible grants following handover.

15. The method of claim 13, wherein periodicity is maintained by causing the target network node to provide a specific start time for the mobile device to use the radio resources provided of the target network node.

16. The method of claim 13, wherein periodicity is maintained by allowing the mobile device to utilize an exceptional resource pool for a device-to-device connection following handover until further instructed.

17. A method comprising:
receiving at a device, a first periodical scheduling configuration provided from a source network node for device-to-device connection;
receiving at the device, an indication to begin use of the first periodical scheduling configuration for communications between devices;
receiving at the device a handover command including a second periodical scheduling configuration provided from a target network node for a device-to-device connection; and
broadcasting via the device device-to-device communications using the second periodical scheduling configuration while maintaining periodicity.

18. The method of claim 17, wherein periodicity is maintained by reserving recurring radio resources for all possible grants following handover.

19. The method of claim 17, wherein periodicity is maintained by receiving a specific start time for the device to use the radio resources provided of the target node.

20. The method of claim 17, wherein periodicity is maintained the mobile device utilizing an exceptional resource pool for a device to device connection following handover until further instructed.

* * * * *